Figure 3:
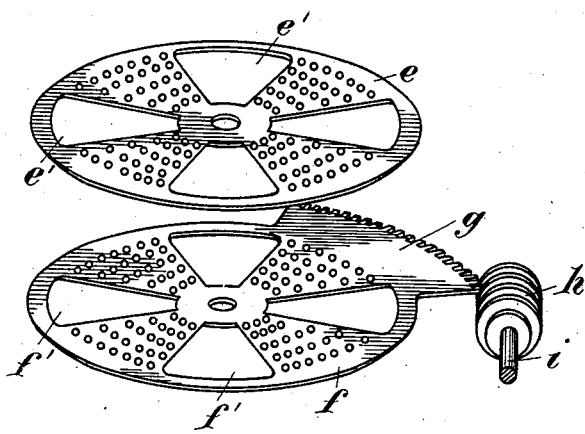

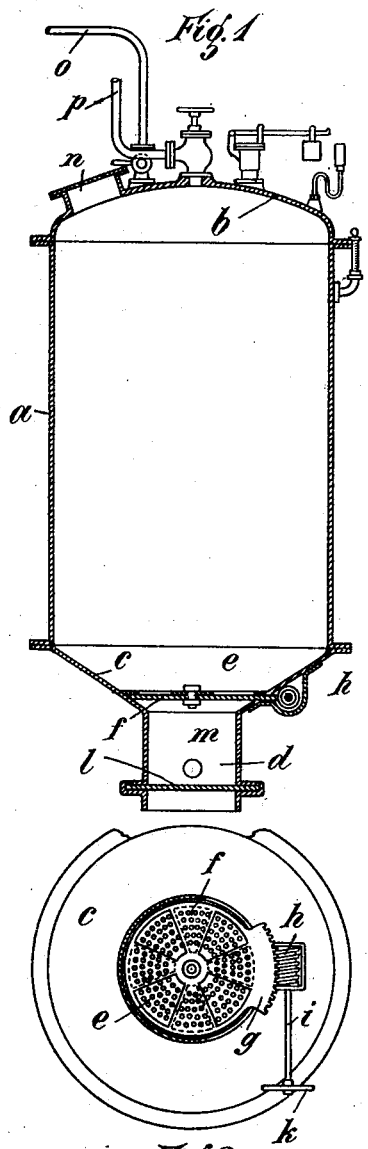

No. 755,144. PATENTED MAR. 22, 1904.
V. LAPP.
METHOD OF STEEPING GRAIN.
APPLICATION FILED SEPT. 17, 1902.
NO MODEL. 2 SHEETS—SHEET 2.

Witnesses:
L. Waldman
C. Heymann.

Inventor:
Valentin Lapp
by B. Singer
atty.

No. 755,144. Patented March 22, 1904.

UNITED STATES PATENT OFFICE.

VALENTIN LAPP, OF LINDENAU, NEAR LEIPZIG, GERMANY.

METHOD OF STEEPING GRAIN.

SPECIFICATION forming part of Letters Patent No. 755,144, dated March 22, 1904

Application filed September 17, 1902. Serial No. 123,717. (No specimens.)

*To all whom it may concern:*

Be it known that I, VALENTIN LAPP, a subject of the King of Saxony, residing at Lindenau near Leipzig, in the Kingdom of Saxony, in the German Empire, have invented certain new and useful Improvements in Methods of Steeping Grain, of which the following is a specification.

Grain has heretofore been steeped by being alternately treated with water and air. This treatment is favorable to germination, but requires a comparatively long time—that is, from three to four days.

The objects of the present invention are to greatly reduce the time necessary for such treatment or to produce the desired results in from one-third to one-fourth the time previously required and to treat the grain so that germination will proceed rapidly and easily. These objects are obtained by the following process, which is performed in a closed vessel:

The grain is first steeped in water having a temperature of 12° centigrade, the water being renewed several times, preferably three or four times, in twenty-four hours. In the last renewal the water should be used at 15° centigrade. At such renewal of the water the old water is first run off, and before the new is poured in the grain is exposed for about an hour to the action of liquid air. As the grain is contained in a closed vessel, it is subjected to the pressure of the evaporating and expanding liquid air. This pressure is also maintained when the water is turned on. In this treatment the grain is permeated and agitated by the air, so that each kernel is exposed to its action as well as to the action of the moisture remaining after the water has been drawn off. The steeping process is completed in from twenty-six to thirty hours, and the germination of the grain may commence at once.

The process is preferably carried out in high cylindrical vessels of such proportions that one square meter of bottom area will carry about one hundred hundredweights and be sufficiently strong to withstand the internal pressure.

In the drawings, Figure 1 is a vertical sectional view of a vessel adapted to be used in carrying out this process. Fig. 2 is a bottom plan view of the same with parts shown in section. Fig. 3 is a perspective view showing the disk $f$ separated from the bottom $e$.

The vessel consists of a cylinder $a$, having a closed top $b$ and a conical lower portion $c$, terminating in a pipe $d$. This pipe leads to the germinating vessel, which is not shown, as it forms no part of the present invention. The conical portion $c$ is provided with a perforated bottom $e$, under which is pivoted a perforated rotary disk $f$, having a toothed segment $g$, which engages a worm $h$ on a shaft $i$. This shaft is supported in suitable bearings and is turned by a hand-wheel $k$. The slide $f$ is provided with several large apertures $f'$, which may be brought to register with similar apertures $e'$ in the bottom $e$ by turning the disk by means of the mechanism described. As shown in Fig. 2 these apertures are closed and the grain cannot escape, but in Fig. 3 the apertures register and the grain may then run out through the pipe $d$. A slide $l$ in the pipe $d$ is provided for completely closing the same, and the water may be drawn off through an opening $m$ provided for this purpose above the slide. In the top of the cylinder is a manhole $n$ for the introduction of the grain to be steeped, a pipe $o$ for letting in the water, and a pipe $p$ for the liquid air. There are also the necessary fittings, such as a thermometer, pressure-gage, and safety-valve.

The grain having been introduced into the cylinder, a sufficient amount of water having a temperature of 12° centigrade is turned on to cover the same. The cylinder is then entirely closed and the grain left immersed for about four hours, after which the water is drained off through the outlet M. The liquid air is then admitted until a pressure of from one-half to one atmosphere is obtained. This expands and spreads throughout the grain, putting the latter under pressure and penetrating the separate kernels. At the end of an hour water is again let into the cylinder $a$ without reducing the existing pressure. Again, after four hours have elapsed this water is drained off; but as this is done the pressure is somewhat reduced and more liquid air is then let into the cylinder to again raise the pressure. These changes are repeated in the following sequence and number of times, namely: First, the mixture of grain and water produced within the cylinder *a* remains within the same for about four hours; second, then the water is drawn off and liquid air is introduced into the cylinder and allowed to act upon the grain for about one hour; third, fresh water of about 12° centigrade is introduced into the cylinder and remains mixed with the grain for about four hours; fourth, the liquid air is again introduced into the cylinder and allowed to remain one hour; fifth, fresh water of about 12° centigrade is again introduced into the cylinder and allowed to remain four hours; sixth, liquid air is again introduced into the cylinder and allowed to act upon the grain for one hour; seventh, fresh water of about 12° centigrade is again admitted into the cylinder and allowed to remain mixed with the grain for about four hours; eighth, liquid air is again introduced into the cylinder and allowed to act upon the grain for about one hour; ninth, fresh water of 15° centigrade is introduced into the cylinder and remains mixed with the grain for about four hours, the total time consumed being twenty-four hours. When the last quantity of water has been drawn off, the steeping of the grain is finished and the latter may be allowed to flow out through the pipe *d* into the germination vessel.

The total amount of liquid air used is about one liter for one hundred hundredweight of grain. This quantity of liquid air is not introduced all at one time, but as the changes above described are made. However, the quantity varies with the quality and nature of the grain. For instance, if barley is being steeped the quantity of liquid air varies with the nature and quality of the barley—that is to say, that in treating barley which becomes rapidly heated a greater quantity of liquid air must be used, while for barley which becomes heated less rapidly a less quantity of liquid air is required. The proportion may be said to be such that for barley which absorbs heat more rapidly thirty to forty and in some cases even fifty per cent. more liquid air is used than for barley which absorbs air less rapidly. Of course the quantity of liquid air varies also according to the size of the receptacle in which the barley is arranged. In one receptacle there may, for instance, be a free space up to twenty-five per cent. above the grain, while in another there may be a free space of thirty per cent., and even up to fifty per cent. The apparatus, on the other hand, may be filled entirely, so as to leave a free space of five to ten per cent. only above the grain. In view of the fact that the quantity of liquid air depends on the various points set forth above it is difficult to state any exact figure as to the quantity used. It will therefore be noted that the liquid air is used in a different proportion with grain which absorbs heat easily from that used with grain which absorbs heat less easily. In some cases it becomes necessary to use from four to five liters of liquid air for one hundredweight of grain.

Having thus described my improved process, what I claim, and desire to secure by Letters Patent, is—

1. The process of steeping grain, consisting in alternately subjecting the grain, in a closed vessel to the action of water at 12° centigrade and liquid air and finally subjecting the grain to the action of water at 15° centigrade, substantially as described.

2. The improved process of steeping grain, consisting in immersing the grain in water at about 12° centigrade, then drawing off the water and subjecting the grain to the action of liquid air, then repeating these changes once or oftener and finally immersing the grain in water at about 15° centigrade, substantially as described.

3. The method of steeping grain consisting in immersing the grain, in a closed vessel, in water at substantially 12° centigrade for about four hours, then drawing off the water, and subjecting the wet grain to the action of liquid air for about one hour, repeating said changes or treatments once or oftener and finally immersing the grain in water at about 15° centigrade.

4. The method of steeping grain, consisting in immersing the grain in water in a closed vessel, then drawing off the water and introducing liquid air into the vessel and subjecting the grain to the action and pressure of the same as it expands, then again introducing water into the vessel while maintaining the pressure, repeating said treatment once or oftener and finally introducing water at a higher temperature into the vessel substantially as described.

In witness whereof I have hereunto set my hand in presence of two witnesses.

VALENTIN LAPP.

Witnesses:
RUDOLPH FRICKE,
FREDERICK J. DIETZMAN.